Patented Apr. 1, 1941

2,236,933

UNITED STATES PATENT OFFICE 2,236,933

PROCESS FOR TREATING CRUDE MAHOGANY SULPHONATES

John Albert Beck, Jr., Karns City, Pa., assignor to Pennsylvania Refining Company, Karns City, Pa., a corporation of Pennsylvania No Drawing. Application June 12, 1939, Serial No. 278,761

14 Claims. (Cl. 260—504)

This invention relates to a process for the removal of mineral oil and inorganic salt impurities from crude mahogany sulphonate.

The object of the invention is to develop a process for the purification of crude mahogany sulphonate which is simple, direct, and which eliminates many of the expensive and time consuming steps required by the processes now being used.

As is well known, crude mahogany sulphonates are produced by the conventional refining treatment of certain lubricating oil distillates derived from petroleum. These crude mahogany sulphonates, also called mahogany soap, are the salts of the mahogany sulphonic acids which are formed by the reaction of the fuming sulphuric acid, used in the refining operation, on lubricating oil distillates. This refining step is carried out in the manner well known to the art, and results in the formation of sulphonic acids of two types. Type one, the so called green petroleum sulphonic acids, are water soluble and are principally removed with the sludge fraction produced by the acid treatment. The second type are soluble in the petroleum oil and are the mahogany sulphonic acids. The mahogany sulphonic acids are then converted into the mahogany sulphonate salt by direct neutralization, and the mahogany sulphonate may thereafter be removed by suitable extraction. Or the mahogany sulphonic acids may be removed from the oil directly and then neutralized.

The resulting mahogany sulphonates are widely used in the art as emulsifying agents, dispersing agents and the like. Although the mahogany sulphonates are probably not pure compounds, but are undoubtedly the sulphonic acid salts of a number of closely related organic compounds, the presence of inorganic salt impurities greatly lowers their efficiency and value as emulsifying agents, etc. The inorganic salts are principally sodium sulphate formed in the neutralization step. These crude mahogany sulphonates are obtained also admixed with considerable amounts of valuable mineral oil carried over in the separation step. The separation of the mineral oil from the mahogany sulphonates is therefore desirable.

I have found a new and useful method for removing the salt impurities and also the mineral oil from these mahogany sulphonates.

Broadly, my process comprises dissolving the mahogany sulphonate in a water insoluble organic solvent such as ethylene dichloride, chlorobenzene or the like, and then washing this solution with a dilute aqueous solution of a water soluble organic solvent such as ethyl alcohol, acetone and the like. The salt impurities in the mahogany sulphonate are dissolved out in the aqueous wash solution. The concentration of the aqueous ethyl alcohol, (or other water soluble organic solvent), solution, must be within the range of from 1 to 20% and should preferably be about 5% on a volumetric basis. At alcohol concentrations below this range or with a pure water wash, an emulsion is formed which destroys all the advantages of the process. Where an emulsion is formed it becomes as difficult to remove the wash solution as the removal of the inorganic salt by conventional filtration methods. On the other hand, where the concentration of the organic solvent exceeds 20%, the wash solution becomes very soluble in the water insoluble solvent and there is little, if any, tendency towards separation of the wash solution.

The following specific examples illustrated the preferred methods of carrying out my process:

Example 1

500 grams of crude mahogany sulphonate were dissolved in 1500 cc. of ethylene dichloride at a temperature of 130° F. This solution was then washed with 1000 cc. of a 5% ethanol solution, and after 5 minutes 820 cc. of ethanol solution containing dissolved salt separated out and was drawn off. The mixture was then washed a second time with 500 cc. of 5% ethanol solution, of which 310 cc., carrying more dissolved salt, separated out and was drawn off. The mixture of sulphonate, ethylene dichloride, and ethanol solution was then cooled to 75° F., at which it again separated into two layers, the lower layer containing 1450 cc. of ethylene dichloride, of which 160 cc. was a 5% sulphonate-in-oil solution, and a small amount of residual ethanol wash solution, and the upper layer containing the remaining residual wash solution and ethylene dichloride together with the purified mahogany sulphonate. The residual wash solution and ethylene dichloride may readily be removed from the sulphonate, and the sulphonate recovered substantially free from inorganic salts and oil.

Example 2

500 grams of crude mahogany sulphonate were dissolved in 1500 cc. of nitrobenzene at a temperature of 130° F. This solution was then given two washes with a 5% ethanol solution in the manner described in Example 1, except that after the second wash only about 150 cc. of wash solution separated out and was drawn off. In the case where nitrobenzene was used, it was not necessary to cool the mixture to obtain a separation of the oil-solvent layer from the purified sulphonate. This separation occurred at the elevated temperature, and 1500 cc. of the nitrobenzene-oil layer, of which about 100 cc. was a 5% sulphonate-in-oil solution, separated out from the purified sulphonate solution in the residual nitrobenzene and ethanol wash.

Example 3

500 grams of crude mahogany sulphonate were dissolved in 1500 cc. of chlorobenzene at a temperature of 130° F. This solution was then washed with a 5% solution of isopropanol using two washes in the manner described in Example 1. Where the isopropanol was used with the chlorobenzene solvent, 780 cc. of the isopropanol solution separated off after the first wash, and 150 cc. after the second. With the chlorobenzene solvent there was no separation of the chlorobenzene and sulphonate upon cooling, and the chlorobenzene solvent had to be removed by distillation. Also, the oil was not removed from the purified mahogany sulphonate by the washing process, although it could, of course, be removed by further suitable extraction if desired. Apparently, the solubility of the sulphonate in the chlorobenzene was too great, even after the alcohol washing steps, to separate out spontaneously or by cooling.

Example 4

500 grams of mahogany sulphonate dissolved in 1500 cc. of ethylene dichloride were washed with an ethanol solution as described in Example 1, except that a 10% solution of the ethanol was used. After the first wash, 750 cc. of the ethanol solution separated off, and after the second wash, 150 cc. separated off. The remaining ethylene dichloride, sulphonate, oil and ethanol solution mixture was cooled as in Example 1, and the oil-ethylene dichloride separated off from the purified mahogany sulphonate solution.

In place of ethylene dichloride, chlorobenzene, and nitrobenzene solvents described in connection with the specific examples above, other water-immiscible organic solvents such as tetrachlorethane, trichlorethylene, perchlorethylene, amylchlorides, carbon tetra chloride, dichlormethane, dichlorethylene, and the like may be used.

Likewise, the invention is not limited to the use of ethanol or isopropanol wash solutions, but other water soluble organic solvents such as methanol cellosolve, methyl cellosolve acetate, methyl ethyl ketone, acetone, butanol, dioxan, the ethanol amines and the like can be substituted with equal success.

Although I prefer to use, as shown in the examples, about a three to one ratio of water-immiscible solvent to sulphonate in forming the initial solution, the proportions used are not limited to this ratio. The three to one ratio is selected merely because it produces a solution of low enough viscosity, and for economic reasons. Although the sulphonate may be dissolved in an equal amount of solvent or less, such solutions are viscous and difficult to wash. On the other hand, an excess of solvent merely increases the cost of the process. Furthermore, where a spontaneous separation of the sulphonate and solvent occurs after the washing step, as in the case of ethylene dichloride and nitrobenzene solvents, an excess of the solvent merely increases the amount of sulphonate carried over with the solvent, since some of the sulphonate is dissolved therein. The recovery of this dissolved sulphonate entails more expensive methods.

The proportions of the wash solutions used are largely arbitrary. In order that there will be separation of the wash solution and removal of the inorganic salt, a sufficient amount of the wash solution must be used to exceed the solubility of the wash solution in the water-immiscible solvent. Although the aqueous wash solution normally has but slight solubility in the water-immiscible solvent, the wash solution is soluble to an appreciable extent therein where the water-immiscible solvent contains dissolved mahogany sulphonate. This may be readily seen from the study of the examples. Actually, I have found that the solvent-oil layer, although saturated with aqueous wash solution, contains less than 1% of the wash solution. On the other hand, where the solvent contains dissolved mahogany sulphonate, the solubility of the wash solution therein is many times greater. The solubility varies widely, of course, with the amount of dissolved sulphonate and concentration of water-immiscible solvent in the wash. In order to remove the inorganic salt substantially completely, the volume of wash solution should be considerably above the amount dissolved. Here also, some of the sulphonate is dissolved in the wash solution and an unnecessary excess of wash solution merely increases the waste in the process. Preferably, the volume of wash solution is kept within a ratio of two to eight to one, based on mahogany sulphonate.

As pointed out before, a particular feature of my process, in the cases where ethylene dichloride or nitrobenzene are used as solvents, is the fact that not only are the inorganic salt impurities removed, but the oil impurities are also removed. While the inorganic salts are the principal impurities which detract from the emulsifying properties and hence the commercial value of the mahogany sulphonate, in many cases it is desirable that the oil impurity also be removed. In the case of these two water-immiscible solvents, my process provides a simple method for the simultaneous removal of the oil impurity. I do not ascribe the difference in behavior of these two solvents from the other solvents used to a difference in chemical properties, but it is apparently caused by the lesser solubility of the sulphonate therein; so that when these solvents become saturated with wash solution, the sulfonate separates out spontaneously in the case of nitrobenzene, or upon simple cooling in the case of the ethylene dichloride. This is true whether an ethanol wash is used, or whether the wash is one of the other water soluble organic solvents.

The washing may be done in one or a plurality of steps. Washing in one step is, of course, the simplest. Since the amount of salt removed, with a given amount of wash solution, will vary directly with the number of washing steps, a plurality of washing steps is desirable. As shown in the specific examples, I have found that washing in two stages results in a satisfactory removal of the inorganic salts, although my process should in no respect be construed as limited thereto. Nor is my process limited to a two step washing process in order to obtain the final separation of the mahogany soap from the water-immiscible solvent in the case of ethylene dichloride and nitrobenzene solvents where the spontaneous separation is obtained. The separation can be readily obtained after the first wash, if desired, by lowering the temperature of the mixture. In the case of these two water-immiscible solvents, the choice of a two step washing process is merely preferred since it results in the most economical removal of the major portion of the salt impurities.

I claim:

1. A process of purifying crude mahogany sulphonates containing inorganic matter and oil which comprises, adding to one part of said crude mahogany sulphonates more than one part of a substantially water-immiscible organic solvent in which the crude mahogany sulphonate is soluble, and subsequently washing the solution of the crude mahogany sulphonate with an aqueous solution of from 1 to 20% of a water soluble organic solvent, whereby the inorganic salt impurities are removed from the solution of the mahogany sulphonate.

2. A process of purifying crude mahogany sulphonates containing inorganic matter and oil which comprises, dissolving one part of the crude mahogany sulphonates in approximately three parts of a substantially water-immiscible organic solvent, and subsequently washing said mahogany sulphonate solution with an aqueous solution containing about 5% of a water soluble organic solvent, whereby the inorganic salt impurities are removed from the solution of the mahogany sulphonate.

3. The process of claim 2 in which ethylene dichloride is the water-immiscible organic solvent.

4. The process of claim 2 in which nitrobenzene is the water-immiscible organic solvent.

5. The process of claim 2 in which chlorobenzene is the water-immiscible organic solvent.

6. A process of purifying crude mahogany sulphonates containing inorganic matter and oil which comprises, dissolving one part of the crude mahogany sulphonates in approximately three parts of a substantially water-immiscible organic solvent, and subsequently washing said mahogany sulphonate solution with an aqueous solution containing from 1 to 20% of a water soluble organic solvent, whereby the inorganic salt impurities are removed from the solution of the mahogany soap.

7. A process of purifying crude mahogany sulphonates containing inorganic matter and oil which comprises, dissolving one part of the crude mahogany sulphonates in more than one part of ethylene dichloride, and subsequently washing the solution of the crude mahogany sulphonate with an aqueous solution of from 1 to 20% of a water soluble organic solvent, whereby the inorganic salt impurities are removed from the solution of the mahogany soap.

8. A process of purifying crude mahogany sulphonates containing inorganic matter and oil which comprises, dissolving one part of the crude mahogany sulphonates in more than one part of nitrobenzene, and subsequently washing the solution of the crude mahogany sulphonate with an aqueous solution of from 1 to 20% of a water soluble organic solvent, whereby the inorganic salt impurities are removed from the solution of the mahogany sulphonate.

9. A process of purifying crude mahogany sulphonates containing inorganic matter and oil which comprises, dissolving one part of the crude mahogany sulphonates in more than one part of chlorobenzene, and subsequently washing the solution of the crude mahogany sulphonate with an aqueous solution of from 1 to 20% of a water soluble organic solvent, whereby the inorganic salt impurities are removed from the solution of the mahogany sulphonate.

10. A process of purifying crude mahogany sulphonates containing inorganic matter and oil which comprises, adding to one part of said crude mahogany sulphonates more than one part of a solvent of the group consisting of ethylene dichloride and nitrobenzene, washing the solution of the crude mahogany sulphonate with an aqueous solution of from 1 to 20% of a water soluble organic solvent, whereby the inorganic salt impurities are substantially removed from the solution of the mahogany sulphonate, and finally allowing the solution of the mahogany sulphonate to separate into two layers, one layer comprising the solvent saturated with aqueous solvent and mahogany sulphonate, and the other layer comprising the substantially purified mahogany sulphonate.

11. A process of purifying crude mahogany sulphonates containing inorganic matter and oil which comprises, dissolving one part of the crude mahogany sulphonates in more than one part of ethylene dichloride at a temperature of from 110°–150° F., washing this solution with an aqueous solution of from 1 to 20% of a water soluble organic solvent of approximately the same temperature, and then cooling the crude mahogany sulphonate solution below 90° F. whereby a separation of the solution into two layers occurs, one of said layers comprising the substantially purified mahogany sulphonate.

12. A process of purifying crude mahogany sulphonates containing inorganic matter and oil which comprises, dissolving one part of the crude mahogany sulphonates in approximately three parts of ethylene dichloride at a temperature of from 110°–150° F., washing this solution with an aqueous solution of 5% ethyl alcohol of approximately the same temperature, and then cooling the crude mahogany sulphonate solution below 90° F., whereby a separation of the substantially purified mahogany sulphonate from the oil is obtained.

13. A process of purifying crude mahogany sulphonates containing inorganic matter and oil which comprises, dissolving one part of the crude mahogany sulphonates in more than one part of nitrobenzene at a temperature of from 110°–150° F., washing this solution with an aqueous solution of from 1 to 20% of a water soluble organic solvent of approximately the same temperature, and then allowing the whole mixture to separate into three layers, the upper layer comprising the wash solution containing dissolved inorganic salts, the bottom layer comprising the nitrobenzene and oil, and the intermediate layer comprising the substantially purified mahogany sulphonates.

14. A process of purifying crude mahogany sulphonates containing inorganic matter and oil which comprises, dissolving one part of the crude mahogany sulphonate in approximately three parts of nitrobenzene at a temperature of from 110°–150° F., washing the solution with approximately two parts of an aqueous solution of 5% ethanol of approximately the same temperature, drawing off the wash solution containing dissolved inorganic matter, washing the solution again with approximately one part of an aqueous solution of 5% ethanol and allowing the mixture to separate into three layers, the upper layer comprising the aqueous ethanol containing dissolved inorganic matter, the bottom layer comprising introbenzene and oil, and the intermediate layer comprising the substantially purified mahogany sulphonates.

JOHN A. BECK, Jr.